US005430524A

United States Patent [19]
Nelson

[11] Patent Number: 5,430,524
[45] Date of Patent: Jul. 4, 1995

[54] UNIBODY PRINTING AND COPYING SYSTEM AND PROCESS

[75] Inventor: William E. Nelson, Dallas, Tex.

[73] Assignee: Texas Instruments Incorporated, Dallas, Tex.

[21] Appl. No.: 218,448

[22] Filed: Mar. 28, 1994

Related U.S. Application Data

[63] Continuation of Ser. No. 54,469, Apr. 28, 1993, abandoned, which is a continuation of Ser. No. 918,520, Jul. 22, 1992, abandoned.

[51] Int. Cl.⁶ .................... G03G 21/00; G03G 15/00
[52] U.S. Cl. .................... 355/200; 355/202; 355/210; 347/135; 347/255
[58] Field of Search ............ 355/200, 202, 204, 208, 355/210, 228, 229, 232, 233, 260; 346/108, 160

[56] References Cited

U.S. PATENT DOCUMENTS

| | | | |
|---|---|---|---|
| 4,712,117 | 12/1987 | Kawaguchi et al. | 346/108 |
| 4,905,022 | 2/1990 | Nagasawa | 346/108 |
| 5,091,747 | 2/1992 | Tsai | 355/202 |
| 5,107,304 | 4/1992 | Haneda et al. | 355/210 X |
| 5,172,161 | 12/1992 | Nelson | 355/200 |

*Primary Examiner*—A. T. Grimley
*Assistant Examiner*—Sandra L. Brase
*Attorney, Agent, or Firm*—Julie L. Reed; James C. Kesterson; Richard L. Donaldson

[57] ABSTRACT

There is disclosed a system and method for assembling all of the parts of a xerographic system in a unitary housing. The unitary molded housing contains the xerographic optics, the modulator, the toner and developer cartridges as well as the printer drum. Using this unitary housing, the modulator can be aligned by using optical sensors in substitution for the printing drum during assembly, and can contain other components such as a document scanner that allows the print engine to also be used as a fax machine, or a copier.

1 Claim, 3 Drawing Sheets

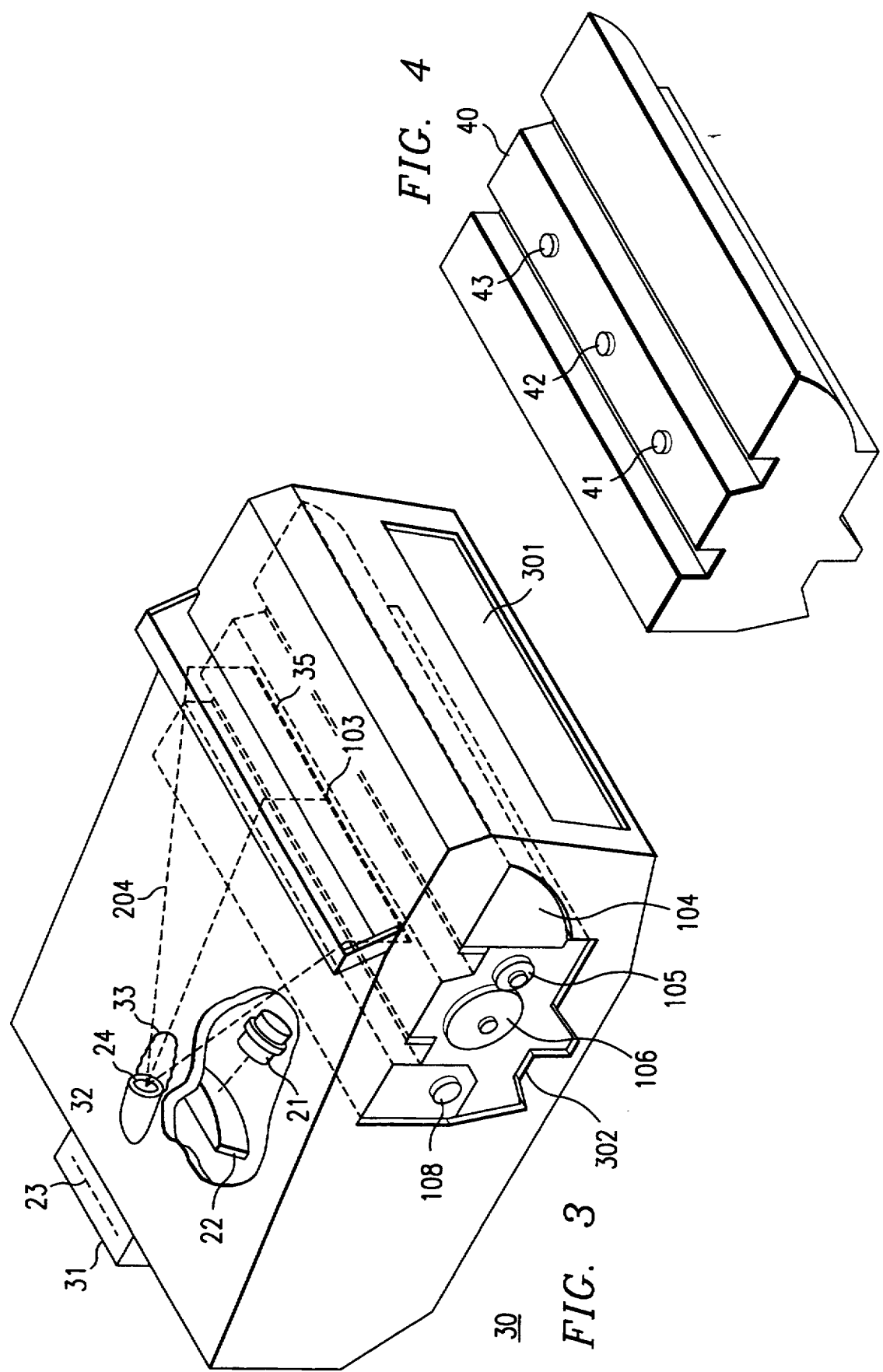

UNIBODY PRINTING AND COPYING SYSTEM AND PROCESS

This application is a continuation of application Ser. No. 08/054,469 filed Apr. 28, 1993, which is now abandoned, which is a continuation of application Ser. No. 07/918,520 filed Jul. 22, 1992, now abandoned.

FIELD OF THE INVENTION

This invention relates to xerographic engines using spatial light modulators, more specifically to systems using these engines.

BACKGROUND OF THE INVENTION

The use of semiconductor light modulators is gaining in popularity as a replacement for the laser polygon scanner in xerographic printing processes. A technology of preference, due to its monolithic, semiconductor fabrication process, is the deformable mirror device (DMD). U.S. Pat. No. 5,041,851, issued Aug. 20, 1991, entitled "Spatial Light Modulator Printer and Method of Operation," assigned to the common assignee with this patent application, which patent is hereby incorporated by reference herein, discusses one embodiment of a DMD device using a tungsten light focused via optics on a DMD array. While the invention in that application functions very well, several areas of improvement have become apparent.

All xerographic printing systems, especially laser systems, suffer from the problem that there are a large number of parts which must be assembled in order to make the process operate properly. In addition to the light modulation system (which contains a number of parts which must be in perfect optical alignment) there is the xerographic drum, the toner delivery system, the developer system, the paper handling system and the fuser system. Systems that use print engines include fax machines and copiers, each which include additional components. Each of these systems have many internal parts which must be accurately assembled and, in addition, all of the systems must be aligned with each other, and remain in alignment for the life of the product.

Thus, in addition to the cost of manufacturing each system, there is the additional cost of assembling each of the systems into the final product. A part of this cost involves the cost of aligning the optical path from the light source, through the modulator to the drum. Compounding the problem is the fact that essentially all of the systems wear out or require adjustment from time to time and therefore can be easily replaced without interfering with, or requiring adjustment to, the optical alignment, or the remaining xerographic components.

Accordingly, there is a need in the art for a printing system in which the xerographic reproduction mechanism can be manufactured with a minimum of parts and where the system elements prone to wear with use are either extremely reliable and long lived, or can be replaced easily while still maintaining both physical and optical alignment.

There is a need in the art for such a system in which the various component can be embedded into a compact system in order to reduce to a minimum the printer system size, while maintaining high reliability and ease of serviceability. The various additional components could be such things as copier interfaces, document scanners and the like, make the printer usable also as a fax machine, document scanner or copier.

SUMMARY OF THE INVENTION

The foregoing goals and objectives can be achieved by the design of a unibody housing which will align and integrate the light source and modulation unit, and accommodate the consumable components, the printing drum, the toner, the fuser and the developer. A heavy gauge, unitary plastic housing has been designed to accommodate the entire system such that the DMD modulator can be "flown" into position with test sensors replacing the xerographic drum. The light modulator can then be precisely imaged onto the position of the drum, the test sensors removed and the actual drum positioned in place, and replaced over the life of the printer without incurring misalignment to the optical exposure system. The fly-into-place concept has been disclosed in U.S. Pat. No. 5,105,369, issued Apr. 14, 1992, entitled "Printing System Exposure Module Alignment Method and Apparatus of Manufacture," which patent is hereby incorporated by reference herein.

Using this unitary housing allows the modulator optics to be installed directly into the housing, thereby eliminating the need for separate parts and alignment difficulties. In addition, changes in physical size from time to time caused by heat, age, or other factors will tend to be uniform over the unitary housing and thus not affect the optical path or other mating relationships.

Accordingly, it is a technical advantage of this invention that a single unitary housing is designed to accept and regulate all components of xerographic process; the DMD modulator, the toner and developer removable subassemblies as well as the printer drum (or belt), and the fuser and related paper path mechanisms.

It is a further technical advantage of this invention that the single unitary housing of the printing system is made from precision molded plastic that is capable of establishing and maintaining the required physical registration of all critical components.

It is a further technical advantage that the housing can hold other systems' components that can share parts of the print engine and housing, such as copiers, fax machines, and document scanning equipment.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 3 shows a pictorial representation of the construction of the unibody printer with a cutaway portion showing the optic path; and FIG. 4 shows an insert for replacing the xerographic drum with a camera assembly for aligning the optics during the manufacture of the integrated DMD-scanner, unibody-shell assembly.

DETAILED DESCRIPTION OF THE INVENTION

Figure 1:
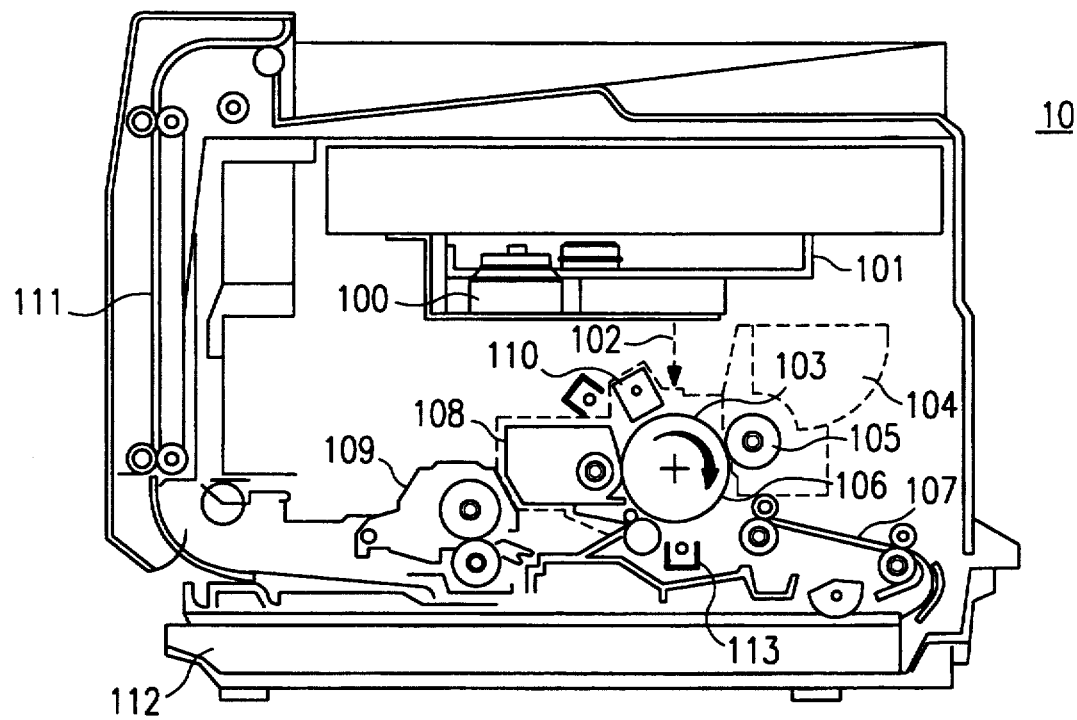
FIG. 1 shows a prior art xerographic printer.

Prior to beginning a description of the present invention, it may be well to review a prior art xerographic printer with respect to FIG. 1. As shown, polygon scanner 100 is contained in polygon scanner assembly 101 and positioned above drum 106. The laser exit point 102 shows the path of the light ray on its way to photoreceptor drum at line 103. Toner supply 104 is mounted above developer roller 105 which is used in the conventional manner to provide toner to photoreceptor drum 106. Paper guide 107 shows one path of paper which would then pass in contact with photoreceptor drum 106 and would subsequently exit the printer via path 111. Main corona unit 110 is mounted above the photoreceptor drum and fuser and cleaner unit 108 is mounted adjacent to photoreceptor drum 106 to clean the drum on each rotation. Paper receives toned image from drum 106 at transfer station 113 and moves through fuser unit 109 on its way to the exit path 111. The paper could be stored in input paper tray 112 prior to presentation to photoreceptor drum 106 for printing.

Due to the construction of this unit or a similar unit using DMD devices as shown in above-mentioned U.S. Patent entitled "Spatial Light Modulator Printer and Method of Operation," it can be seen that all of the elements must be well aligned to the paper path, and any change in any element will require a realignment of the elements so that the laser exit point 102 (or the DMD pixel exit point) is in perfect alignment with the receptor 103 so that printing quality is achieved with consistency.

Figure 2:
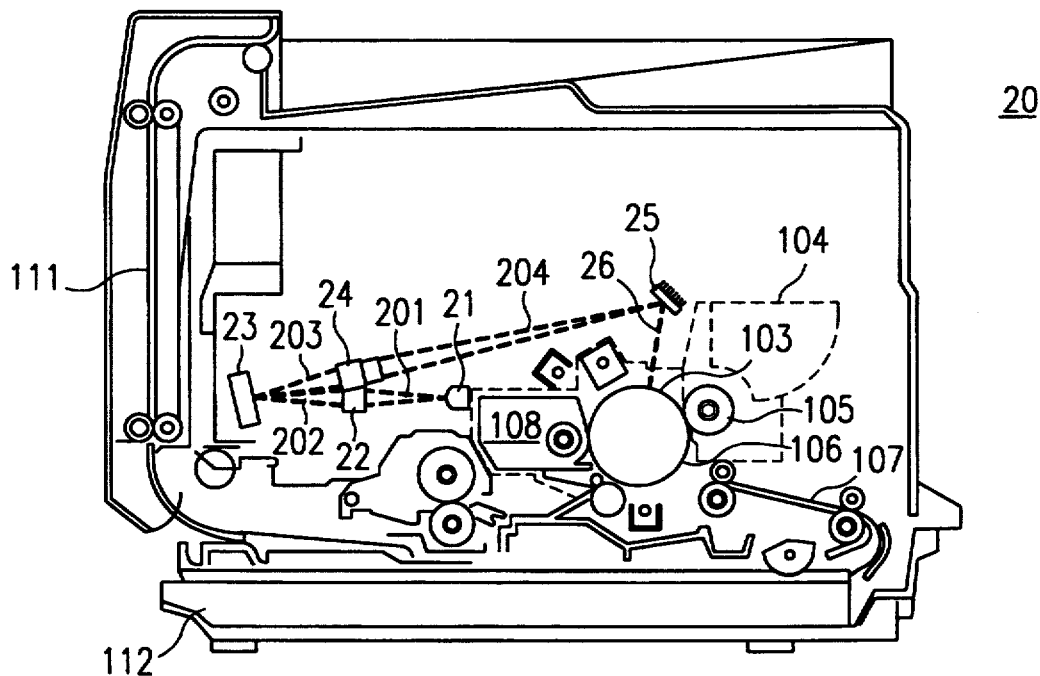
FIG. 2 shows a xerographic printer having a DMD optical system replacing the polygon scanner in accordance with the present invention.

In FIG. 2 there is one embodiment of the present invention where only the basic parts of the xerographic process such as photoreceptor drum 106, toner supply 104, developer roller 105, cleaner 108 and fuser 109 are shown. All of these parts remain the same, and some or all can be configured as a single assembly or cartridge which, as can be seen, can be inserted or removed conveniently from the basic printer chassis from the side access slot. What is different is the optic path which starts from light source 21 which projects via beam 201 through collimator optics assembly 22 into beam 202, which then illuminates DMD light modulator device 23, and modulated light 203 is collected by DMD imager lens assembly 24 into optic path 204, which is then bounced off of fold mirror 25 into the line of pixels for DMD system 26 to impact on photoreceptor drum at line of exposure 103.

Turning now to FIG. 3, the pictorial view shows cutout 302 which has in it elements 104, 105, 106 and 108. The cutaway portion in the top surface of unibody chassis 30, reveals light source 21, which is shown focusing light on condenser optics assembly 22, which in turn directs the light on DMD assembly 31 mounted on the back side of housing 30. This DMD assembly contains DMD 23 (not shown) which in turn modulates the light for presentation to imager lens 24 via bee-thorax light diffuser molded into unibody 32 (not shown), which in turn spreads the beam 204 to fold mirror bracket 34, which contains fold mirror 25 (not shown), which in turn folds the beam down into line 35, which is the DMD image plane line of exposure on photoreceptor 106. A paper cassette fits into slot 301. The bee thorax concept has been disclosed in copending patent application entitled "Printing System Exposure Module Optic Structure and Method", Ser. No. 07/763,742 filed Sep. 20, 1991, (continuation of Ser. No. 07/454/812 filed Dec. 21, 1989).

Because all of the elements, both xerographic components and optics system, are contained within a single housing, any flexing of the housing will tend to move everything equally, and return to equilibrium, thereby maintaining alignment of the system over time and use. Initial alignment of the system is accomplished by removing photoreceptor 106 and inserting alignment assembly 40 which has the exact dimensions of photoreceptor cartridge 106 except that a series of camera (or sensor) assemblies 41, 42, 43 are positioned on the top of the cylinder along the theoretical line of exposure 103. The purpose of the camera assembly is so that when the DMD is flown into place prior to permanently affixing it to unibody 30 at 31, the operation can depend upon the results of the optical input from the camera assemblies to get perfect alignment and, therefore, an operator reviewing the output can adjust the six dimensions of DMD device 23, as well as any of the remaining optics including imager lens 24, to get perfect alignment. Once this alignment is achieved, the DMD is locked into place along with the other optics system, and once so locked, the unibody nature of a printer will prevent any further misalignment, and when xerographic consumables are interchanged, the alignment will remain perfect since they are mounted to the same rigid unibody housing.

Under this concept, the combined assembly alignment tolerances particular to each conventional subassembly, e.g. optical scanner, printer chassis and xerographic components, are reduced by virtue of the unibody assembly procedure, as well as the reduced number of components in the total printer mechanism.

Figure 5:
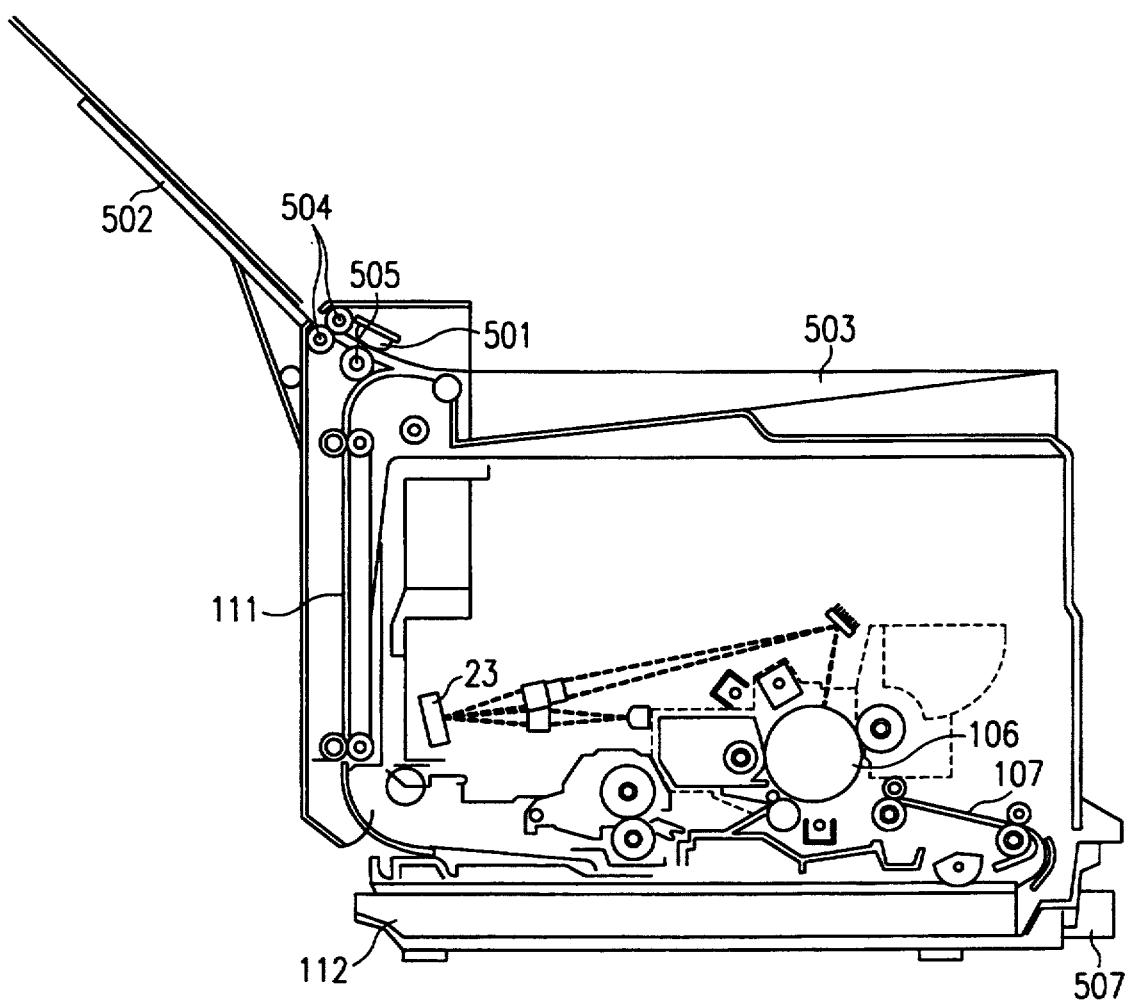
FIG. 5 shows one embodiment of an adapted printer engine for use as a document scanner, copier or fax machine.

Because of the small size and easy alignment of the print engine described in detail above, the unitary housing can be adapted to hold multiple components, converting the printer into a document processing unit. This allows roughly the same size housing to hold not only a printer, but a facsimile (fax) machine, document scanner and digital copier. One embodiment is shown in FIG. 5.

A digital scanner 501, such as the linear contact scanners manufactured by Texas Instruments, can be used to scan a document fed into a tray 502 mounted on the unitary housing. The output of the scanner can be sent to the spatial light modulator 23 and the print engine to produce a copy of the original document. The scanner data enters the drive electronics on the modulator 23, much the same way the data from the host enters, and the paper is taken out of the feed tray 112, through guide roller 107, past the photoreceptor drum 106, much as previously discussed. The DMD 23 processes the data from the scanner, and this data would be placed on the photoreceptor drum 106 to be transferred to the paper. The paper would continue along path 111 to exit tray 501. The input document would also be passed by the input rollers 504 and guide roller 505 into the exit tray 503.

Since the data resulting from the document scanner 501 is digital, it can be returned to the host system (not shown), to which the document processing unit can be connected via a communications port 507. With the use of a modem, the host system can then send that file as a fax. Even without the document scanner, if the host has fax receive capability, the printer could be use as a receive-only fax machine. When a fax is received by a host system, the digital data can be sent to the printer, where the spatial light modulator receives it similar to a host-generated document. In this embodiment, then, the document processing unit has the functionality of a fax machine. Additionally, with the addition of the document scanner, it allows the unit to function as a document input system to the host computer.

The resultant system is a low-cost, compact, document processing unit that is a document scanner, printer, digital copier, and fax machine, with proper optical alignment, that allows easy access to consumable parts.

Although this description describes the invention with reference to the above specified embodiments, it is but one example, and the claims, not this description, limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A document processing unit in communication with a host system comprising:
   a. a document scanner, wherein said scanner converts images to digital data;
   b. a xerographic print engine including:
      i. a light source;
      ii. a photoreceptor;
      iii. a modulator for modulating light from said source in response to digital signals from either said host system, or from said document scanner, wherein said modulator converts said digital signals from either said host system or from said document scanner directly into an image on said photoreceptor;
   c. a communications port operable for receiving data from said host system, and sending data from said document scanner to said host system; and
   d. a unitary body, wherein said unitary body is molded to hold all components of said unit is proper optical alignment such that said proper optical alignment is maintained when any region of said body is flexed.

* * * * *